United States Patent [19]

Holliday et al.

[11] 3,833,342
[45] Sept. 3, 1974

[54] APPARATUS FOR THE PREPARATION AND GROWTH OF CRYSTALLINE MATERIAL

[75] Inventors: Charles Harry Holliday, Newland; William Ritchie MacEwan; John Brian Mullin, both of Malvern Link; Alan Edward Valender Webb, Malvern, all of England

[73] Assignee: National Research Development Corporation, London, England

[22] Filed: Apr. 18, 1972

[21] Appl. No.: 245,088

[30] Foreign Application Priority Data
Apr. 21, 1971   Great Britain.................... 10595/71

[52] U.S. Cl. .......................... 23/273 SP, 23/301 SP
[51] Int. Cl. ............................................. B01j 17/18
[58] Field of Search .................... 23/301 SP, 273 SP

[56] References Cited
UNITED STATES PATENTS

| | | | |
|---|---|---|---|
| 3,210,165 | 10/1965 | Van Run et al. | 23/273 |
| 3,226,203 | 12/1965 | Rummel | 23/273 |
| 3,235,339 | 2/1966 | Brunet et al. | 23/273 |
| 3,391,235 | 7/1968 | Emeis | 23/273 |
| 3,505,127 | 4/1970 | Arthur, Jr. et al. | 23/273 |
| 3,507,625 | 4/1970 | Deyris | 23/273 |
| 3,627,499 | 12/1971 | Le Duc et al. | 23/273 |

*Primary Examiner*—Norman Yudkoff
*Assistant Examiner*—R. T. Foster
*Attorney, Agent, or Firm*—Cushman, Darby & Cushman

[57] ABSTRACT

Apparatus for the treatment and growth of an at least partially volatile crystallisable material includes a chamber of the type in which the walls remain fixed relative to each other during the treatment and growth of the material, means for establishing a liquid seal sensitive to a pressure difference across the walls of the chamber and means responsive to the liquid seal for limiting the pressure difference across the walls of the chamber to achieve a pressure balance. The apparatus may be used, for example, for vertical crystal pulling or horizontal zone melting. The means responsive to the liquid seal may include a sensor responsive to the position of liquid in the means for establishing a liquid seal, and a control valve responsive to the sensor and under the control of which gas may be admitted to or withdrawn from a further chamber surrounding the first mentioned chamber.

8 Claims, 5 Drawing Figures

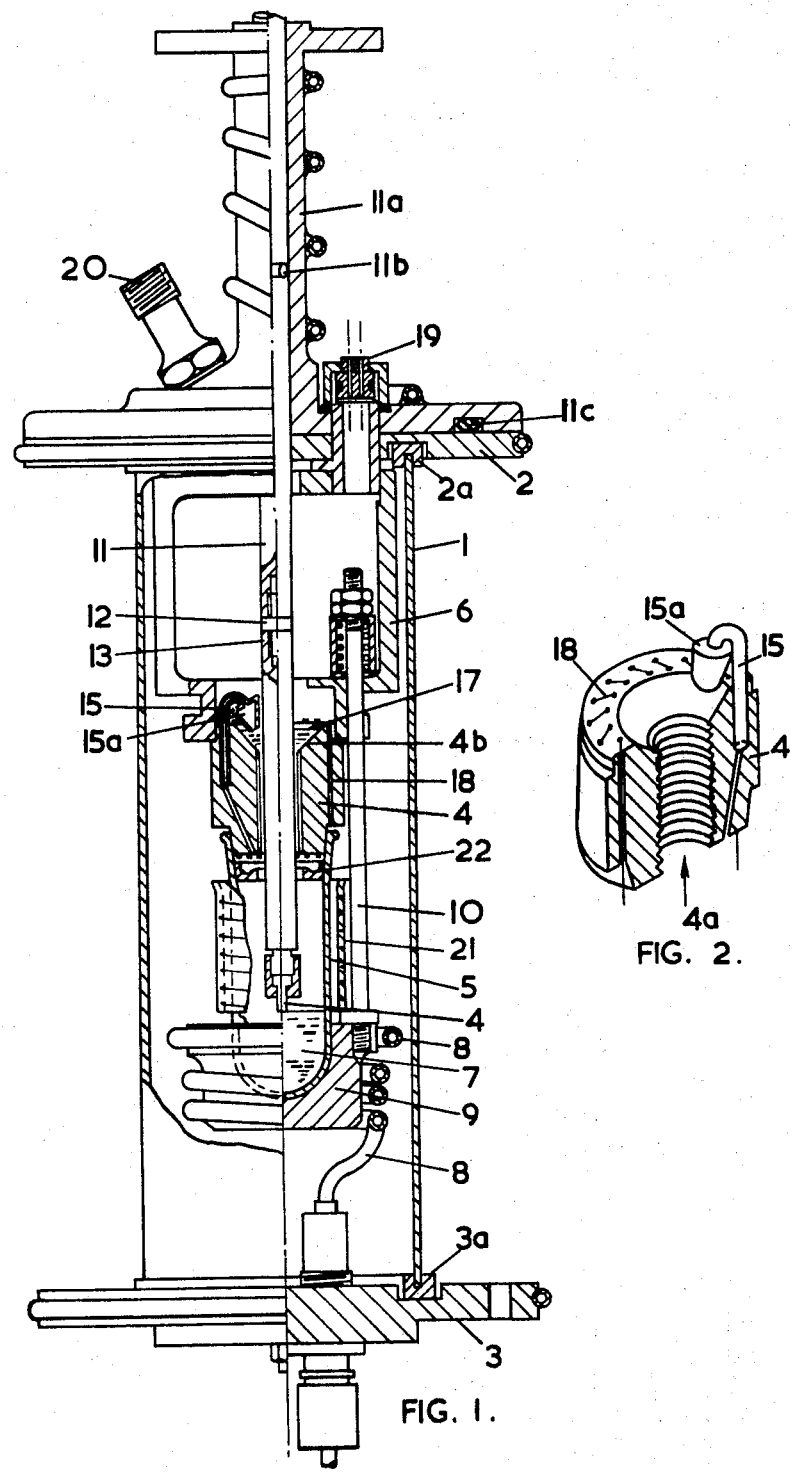

APPARATUS FOR THE PREPARATION AND GROWTH OF CRYSTALLINE MATERIAL

The present invention relates to the preparation and growth of crystalline material.

A basic difficulty is commonly experienced in the preparation of crystalline material which is volatile, or which contains one or more volatile major components or volatile minor additives such as dopants or so-called impurities. Examples of such materials include many compounds of current technological interest such as the so called III-V, II-VI, IV-VI, and II-IV-$V_2$ compounds, specific examples of which are GaAs, InP, GaP, ZnSe, CdS and $ZnSiP_2$.

A favoured method for the preparation of homogeneous crystalline material in bulk form is the so-called melt-growth method in which material is crystallised in a controlled manner from the molten state by the passage of a liquid-solid interface through the material. There are a number of well-known techniques for carrying out this crystallisation process. In the zone melting process, a liquid zone is formed in an ingot or bar of the material and recrystallisation is achieved by causing the zone to move along the ingot. Impurities can be distributed homogeneously or in some regular manner by this process. Zone refining is a zone melting process in which the zone or zones are moved repeatedly and unidirectionally through the bar of material with the intention of concentrating the foreign elements or impurities towards the ends of the bar. In the vertical pulling process a single crystal may be pulled from a melt of the material by dipping a single crystal seed into the liquid and slowly rotating and withdrawing it.

These processes can generally be made to work with pure or nearly pure non-volatile materials, but if the material is volatile or contains volatile components or additives then considerable technical difficulty and much ingenuity is required in avoiding volatilisation effects and unwanted compositional changes in the melt and concomitant deleterious effects which arise in the solid.

The production of many of the aforementioned materials in single crystalline form may involve two operations, firstly the formation of the compound and secondly the growth of the compound as a single crystal. These operations are often carried out at different times in different apparatuses. Clearly it would be advantageous for both of these operations to be carried out consecutively in one apparatus.

As an example of the preparation of a compound having a volatile component the case of gallium arsenide may be noted. At its melting point (1,237°C) this compound is reported to develop an equilibrium vapour pressure of arsenic of one atmosphere. Further, since the vapour pressure of pure arsenic is about one atmosphere at 600°C and more than a hundred atmospheres at 1,237°C it is not considered safe to prepare the compound by heating the elements gallium and arsenic together. Consequently, the normal method of preparation involves distilling the arsenic from a temperature controlled reservoir in a sealed tube into gallium kept at about 1,250°C in a second reservoir or boat some distance away in the same sealed tube. When the distillation is complete the compound gallium arsenide is crystallised from the melt in the second reservoir or boat by appropriate temperature control.

Good crystalline gallium arsenide can be produced by this solidification process, but considerable technical skill and know-how are required if completely single crystals are required. An alternative route to the production of single crystal gallium arsenide is to carry out a controlled crystallisation of the compound as prepared above by a vertical pulling technique. The conventional Czochralski-type technique is, however, not applicable and special methods are needed. These are considered below.

In the case of indium phosphide or gallium phosphide the formation stage is commonly distinct from the growth stage. In fact it is only recently that a reliable commercially feasible technique has been developed for the growth of single crystals of indium phosphide and gallium phosphide. This technique is described in U.K. Pat. No. 1,113,069. The difficulty in the formation stage is the high vapour pressure of phosphorus over melts of indium and gallium phosphides; they are respectively some 21 and 35 atmospheres at about 1,050°C and 1,470°C respectively. It is common practice therefore to react phosphorus or compounds of phosphorus at or below atmospheric pressure with the element. The compound has then to be separated chemically from the excess of unreacted group III element. Single crystals are not readily prepared by this process.

The growth of these compounds as a single crystal also presents considerable technical difficulties whether the formation stage is included or not. As previously indicated the control of the dissociation of the compounds and their volatile products is the central problem in the growth of all the aforementioned materials.

The only known way of controlling dissociation is to allow the melt to equilibrate in a closed environment which is capable of withstanding the dissociation pressure. This principle is common to all the melt-growth techniques so far developed. The practical question of significance is how can controlled orientated crystal growth be achieved in a straight-forward controlled manner which ensures vapour pressure control, eliminates continuous dissociative loss and provides the facility for forming and growing the compound in one operation.

Such an important requirement has attracted much ingenuity but no technique so far developed provides an ideal solution to all the requirements.

For example the so-called vertical Bridgeman technique which involves the controlled crystallisation of the material or compound in a simple tube by passing it through a furnace can in principle be used in addition to form the compound. However, controlled orientated growth is not very feasible, and also deleterious effects such as cracking of the compound can arise due to differential expansion problems.

Other techniques involve the vertical pulling process. In one class of technique the melt and its crucible are enclosed in a sealed or semi-sealed chamber, the walls of which are sufficiently hot to prevent condensation of the volatile components. This technique has been developed in two significant modifications.

In one of these, the so-called magnetic puller, the system is completely sealed and consequently it requires an intricate magnetically-coupled pulling and rotation arrangement. In the other system, the syringe puller, a high temperature ceramic gland is employed to allow rotation and withdrawal motions. However in this process volatilisation cannot be eliminated but only restricted to a minimum. Both these techniques can be used in principle to synthesise compounds prior to growth.

A semi-sealed system based on the use of a liquid gallium seal was proposed in the prior art for the growth of gallium arsenide. This apparatus made use of the rotational and translational movements available to two interpenetrating concentric cylinders. The technique however proved of limited value because of its relative complexity and because the system tended to jam up due to the formation of crystallites of gallium arsenide which form when arsenic vapour saturates the gallium seal.

A technique which is a considerable simplification over the other melt growth techniques is disclosed in U.K. Patent No. 1,113,069. In subsequent publications in the literature the technique has been referred to as the Liquid Encapsulation technique. The volatilisation is suppressed by covering the melt with a transparent inert liquid and constraining the volatile components or impurities in the melt by a physical pressure exerted by an inert gas pressure in excess of the equilibrium pressure over the melt of the material of the most volatile component or impurity. The technique is most effective. It is now widely used because of its simplicity and its ability to grow highly dissociable compounds. The problems are reduced essentially to those of conventional pulling in a pressure chamber.

The technique does require the use of presynthesised compounds. It is also desirable to avoid encapsulants which adversely react with the compound.

The present invention is designed to overcome the limitations of the techniques described whilst retaining so far as possible their advantages. It permits a method of carrying out various melt growth processes to be used for a variety of crystalline materials which are volatile or contain one or more volatile major components or volatile minor additives such as dopants or so-called impurities.

According to the present invention there is provided apparatus for the growth or treatment of an at least partially volatile crystallisable material including a chamber of the type in which the walls remain fixed relative to each other during the growth or treatment respectively of the material, means for establishing a liquid seal sensitive to a pressure difference across the walls of the chamber and means responsive to the liquid seal for limiting a pressure difference across the walls of the chamber to achieve a pressure balance.

The means for establishing a liquid seal may include a tube containing liquid the position of which within the tube is dependent on pressure difference across the walls of the chamber. The means responsive to the liquid seal for balancing a pressure difference across the walls of the chamber may include a sensor responsive to the position of the liquid in the tube and a control valve responsive to the sensor.

The means for establishing a liquid seal may include a tube having a first portion of relatively small cross-sectional area and a second portion of relatively large cross-sectional area, in which the first portion is adapted to contain liquid and which has such a configuration that a pressure difference will drive the liquid into the second portion whereby gas is allowed to flow and the pressure difference is relieved.

In the case of a vertical crystal pulling apparatus the means for establishing a liquid seal may include means for receiving a rod while allowing the rod to have rotational and longitudinally translatable degrees of freedom and a female screw thread in that part of the means for receiving the rod facing the rod adapted to co-operate with the rod in retaining against gravity a liquid held between the screwthread and the rod when the rod is placed in a vertical position, and when the chamber is placed with the screw threaded portion uppermost and the rod is rotated.

Alternatively or in addition, in the case of a vertical crystal pulling apparatus, the means for establishing a liquid seal may include a rod, means for receiving the rod while allowing it to have rotational and longitudinally translatable degrees of freedom and a screw thread on the outside of the rod adapted to co-operate with the means for receiving the rod in retaining against gravity a liquid held between the rod and the means for receiving the rod when the rod is placed in a vertical position, and when the chamber is placed with the means for receiving the rod uppermost and the rod is rotated.

Examples of apparatuses embodying the invention will be described by way of example with reference to the accompanying drawings, in which:

FIG. 1 is a diagram, partly in cross-section, of part of a vertical pulling apparatus embodying the invention;

FIG. 2 is a cut-away perspective view of part of the apparatus described with reference to FIG. 1;

Figure 3:
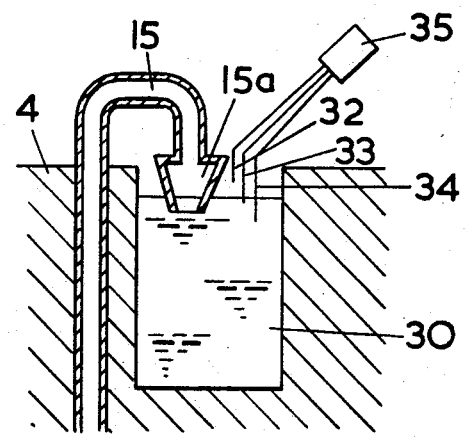
FIG. 3 is a cross-sectional diagram of an alternative form of apparatus incorporating a pressure balancing sensor.

FIG. 1 is a diagram, partly in cross-section, of part of a vertical pulling apparatus embodying the invention, and FIG. 2 is a cut-away perspective view of part of the apparatus. The apparatus includes a main pressure chamber defined by a cylindrical envelope 1 clamped by means not shown between a top plate 2 and a bottom plate 3. The envelope 1 is sealed to the top plate 2 by a gas-tight seal 2a and to the bottom plate 3 by a gas-tight seal 3a. The envelope 1 may for example be a silica tube if the dissociation or vapour pressure of the required compound or its constituents is not greatly in excess of atmospheric pressure. Inside the main pressure chamber an inner growth chamber is defined by a pull rod bearing seal block 4 and a cup-shaped envelope 5. The pull rod bearing seal block 4 is fixed to the top plate 2 by a growth chamber support bracket 6. The pull rod bearing seal block 4 consists of a cylindrical piece of ceramic material such as boron nitride having a vertical central bore 4a for a pull rod. The bore 4a has a coarse female screw thread. At the top end of the bore 4a is a conical well 4b. The inner growth chamber envelope 5 is made of a transparent ceramic such as silica and functions additionally as the crucible for the melt 7. The melt 7 can be held in a separate crucible of a different material inside the envelope 5 if needed.

The lower end of the envelope 5 is held in position by a susceptor 9 which is surrounded by an RF heating coil 8. The melt 7 is heated by coupling radio frequency power from the RF coils 8 into the susceptor 9. Alternative forms of heating, such as resistance heating, could be used to heat the melt. The susceptor 9 is supported by tie rods 10 under spring tension to the growth chamber support bracket 6. A pull rod consists of a steel upper section 11 connected by a pull rod coupling 12 to a ceramic lower section 13. The pull rod upper section 11 is fitted in a tubular holder 11a and there sealed with an O-ring seal 11b which allows rotation and longitudinal motion. The holder 11b is sealed to the top plate 2 by an O-ring 11c. A seed and seed holder 14 are attached to the pull rod lower section 13. A liquid seal 17 is situated between the pull rod and the well 4b at the top of the pull rod bearing seal block 4.

The pull rod bearing seal block 4 has a series of longitudinal holes bored around its circumference and resistance wire is threaded in these holes to constitute a heater 18, the function of which is to maintain the seal 17 liquid. Electric leads to the heater 18 are taken through a bush 19 fitted to the tubular holder 11a and the top plate 2.

The pull rod bearing seal block 4 is also fitted with a pressure balancing bubbler 15 which consists of a tube in the block 4 communicating between the inside of the inner growth chamber and at the other end inverted so that this other end is below the level of the liquid seal 17. The diameter of the end dipping into the liquid seal 17 increases with distance away from the end so that pressure on the surface of the liquid seal 17 will force liquid into this enlarged portion 15a so that the liquid level drops, allowing vapour through the bubbler 15 in order to relieve the pressure difference without forcing liquid along the bubbler 15 into the inside of the inner growth chamber. Excess pressure inside the inner growth chamber will be relieved by vapour flowing through the bubbler 15 or bubbling through the liquid seal 17.

An inlet/outlet port 20 in the holder 11a gives access through the top plate to the inside of the main pressure chamber in order to evacuate it, to fill it with a suitable gas and to control the pressure inside.

An additional feature which may be desirable in certain cases is the provision of a pressure balancing sensor (not shown) responsive to the pressure difference between pressure of the inner growth chamber and the pressure of the main pressure chamber. Such a sensor can be connected to control a three-way valve (not shown) connected to the port 20.

In certain applications it is desirable to provide an auxiliary heater 21 surrounding the envelope 5. The auxiliary heater 21 may be of resistance wire. Thermocouples (not shown) may be used to measure various temperatures, for example the temperature of the melt 7 inside the envelope 5 and inside the pull rod bearing seal block 4. Electric leads to the auxiliary heater 21, the control thermocouples (not shown) and the pressure balancing sensor (not shown) may be taken through the bush 19.

An additional feature which may be useful in certain applications is the provision of a volatile component holder 22 which may be provided in the form of annular trough surrounding the pull rod at the top of the envelope 5.

The action of the apparatus will be described by way of an example concerning the formation of the compound gallium arsenide from its elements gallium and arsenic and its subsequent growth as a crystal of gallium arsenide.

A measured quantity of metallic gallium is inserted in the bottom of the envelope 5, the position which will ultimately be occupied by the melt 7 of gallium arsenide. Sufficient arsenic to react with the gallium is placed in the volatile component holder 22. A suitable quantity of dry lump boric oxide, $B_2O_3$, or an alternative material is placed in the well 4b. The main pressure chamber and the inner growth chamber are first evacuated and then filled with dry insert gas such as nitrogen, argon or helium at a pressure of 1.5 atmospheres. The temperature of the heater 18 is raised, to melt the boric oxide. At the same time the pull rod 11, 12, 13 is rotated in the direction which so co-operates with the thread in the bore 4a that any liquid boric oxide between the bore 4a and the pull rod lower section 13 is driven up so as to maintain the liquid seal.

Power is now supplied to the RF coil 8 in order to melt the gallium and raise its temperature to the melting point of gallium arsenide (1,237°C or thereabouts). This process takes about an hour but is not critical. At the same time the temperature of the auxiliary heater 21 is raised, bringing the arsenic temperature in the volatile component holder 22 to some 570°C or so. The arsenic in the volatile component holder 22 is finally very gradually raised to 610°C by means of the auxiliary heater 21, the temperature of the melt being adjusted just to melt any skin of gallium arsenide which may form. Thermocouples (not shown) against the envelope 5 in line with the volatile component holder 22 and in the pull rod bearing seal block 4 are used to monitor this operation.

Any over-pressure in the growth chamber towards the end of the heating operation during which the melt of gallium arsenide is formed is automatically balanced out by vapour loss through the pressure balancing bubbler.

The single crystal seed on the pull rod is lowered into the melt of gallium arsenide once the melt has been formed. A crystal is then grown by rotation and withdrawal of the seed whilst suitable temperature adjustments are made to the melt.

FIG. 3 is a cross-sectional diagram of an alternative form of apparatus incorporating a pressure balancing sensor. A small well 30 is formed in the top of the block 4. The end 15a of the bubbler 15 dips into liquid in the well 30. Three electric contact wires 32, 33, 34 are held in the well 30 and are connected to a sensing circuit 35. The bare ends of the wires 32, 33 and 34 are arranged to be at the maximum desired liquid surface level, the minimum desired liquid surface level and a level below the minimum liquid surface level, the maximum and minimum surface levels being judged by extremes of tolerance on pressure difference between the inside and outside of the growth chamber.

The action of the apparatus is as follows. An electrically conducting liquid is used. Therefore the effect of a pressure difference causes the wire 34 to lose or gain electrical continuity through the conducting liquid with either the wire 33 or the wires 32 and 33. Then a conventional relay system (not shown) can be controlled by the sensing circuit 35 and made to operate the pressure control valve (not shown) to bring about pressure equilibrium.

Figure 4:
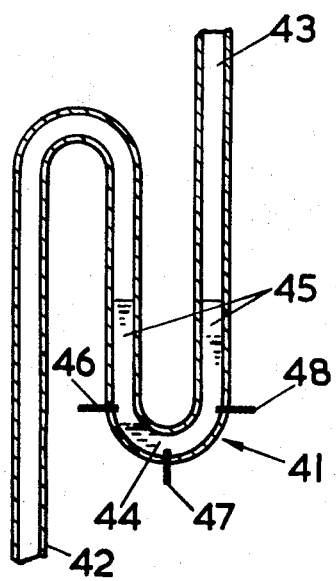
FIG. 4 is a cross-sectional diagram of another alternative form of pressure balancing sensor.

FIG. 4 is a cross-sectional diagram of a further alternative form of pressure balancing sensor. This is essentially a U-tube 41 one end 42 of which is connected to the growth chamber and the other end 43 of which is open to the main pressure chamber. The bottom of the U-tube 41 contains a conducting liquid 44 (such as gallium or mercury) and a small amount 45 of lighter inert liquid such as boric oxide covers each surface of the liquid 44. Three electrodes 46, 47 and 48 are spaced along the U-tube 41 between the ends 42 and 43 in that order.

The action of the sensor is as follows. When the pressures at the ends 42 and 43 are the same the conducting liquid 44 connects all three electrodes 46, 47 and 48. If the pressure at the end 43 is sufficiently greater than the pressure at the end 42 then the liquid 44 will be forced into a position in which the electrode 48 is no longer in contact with the electrodes 46 and 47. On the other hand, if the pressure at the end 42 is sufficiently greater than the pressure at the end 43 then the liquid 44 will be forced into a position in which the electrode 46 is no longer in contact with the electrodes 47 and 48. The presence or absence of electrical contact can be relayed through a conventional relay system in order to effect the operation of pressure control valves which can add or release inert gas from the main pressure chamber 1, as in the case of the sensor described above with reference to FIG. 3.

If a pressure balancing sensor is employed then a pressure balancing bubbler is not strictly needed, but one may be incorporated for use as a safety valve. A pressure balancing sensor is desirable with the more highly dissociable compounds. With the less highly dissociable compounds such as gallium arsenide a pressure balancing bubbler may suffice with only a minute loss of volatile species from the growth chamber.

The action of apparatus incorporating a pressure balancing sensor will be described by way of an example concerning a slightly different procedure for the formation of the compound gallium arsenide from its elements gallium and arsenic and its subsequent growth as a crystal of gallium arsenide.

A measured quantity of metallic gallium is inserted in the bottom of the envelope 5, the position which will ultimately be occupied by the melt 7 of gallium arsenide. Sufficient arsenic to react with the gallium is placed in the volatile component holder 22. A suitable quantity of dry lump boric oxide, $B_2O_3$, or an alternative material is placed in the well 4b. The main pressure chamber and the inner growth chamber are first evacuated and then filled with dry inert gas such as nitrogen, argon or helium and finally evacuated. This procedure is repeated several times. The temperature of the heater 18 is raised to melt the boric oxide. At the same time the pull rod 11, 12, 13 is rotated in the direction which so co-operates with the thread in the bore 4a that any liquid boric oxide between the bore 4a and the pull rod lower section 13 is driven up so as to maintain the liquid seal.

Power is now supplied to the RF coils 8 in order to melt the gallium and raise its temperature to the melting point of gallium arsenide (1,237°C or thereabouts). This process takes about an hour but is not critical. At the same time the temperature of the auxiliary heater 21 is raised, bringing the arsenic temperature in the volatile component holder 22 to some 570°C or so. The arsenic in the volatile component holder 22 is finally very gradually raised to 610°C by means of the auxiliary heater 21, the temperature of the melt being adjusted just to melt any skin of gallium arsenide which may form. Thermocouples (not shown) against the envelope 5 in line with the volatile component holder 22 and in the pull rod bearing seal block 4 are used to monitor this operation.

The heater 18 melts the liquid in the pressure balancing sensor at the same time as it brings about the formation of the liquid seal. Consequently during the heating operation which forms the melt of gallium arsenide the pressure in the main pressure chamber is automatically sensed and adjusted to balance the pressure in the growth chamber.

The single crystal seed on the pull rod is lowered into the melt of gallium arsenide once the melt has been formed. A crystal is then grown by rotation and withdrawal of the seed whilst suitable temperature adjustments are made to the melt.

The apparatus described above with reference to FIG. 1 is a low-pressure system but the invention can equally be applied to a high-pressure system, either using a pressure balancing bubbler or a pressure balancing sensor or both. Such systems are used for the manufacture of compounds having constituents with very high vapour pressures over melts of the compounds. For example, as stated above, the vapour pressures of phosphorus over melts of indium phosphide and gallium phosphide are some 21 and 35 atmospheres at about 1,050°C and 1,470°C respectively.

The invention can also be applied to the preparation and growth of crystals in the horizontal system.

Figure 5:
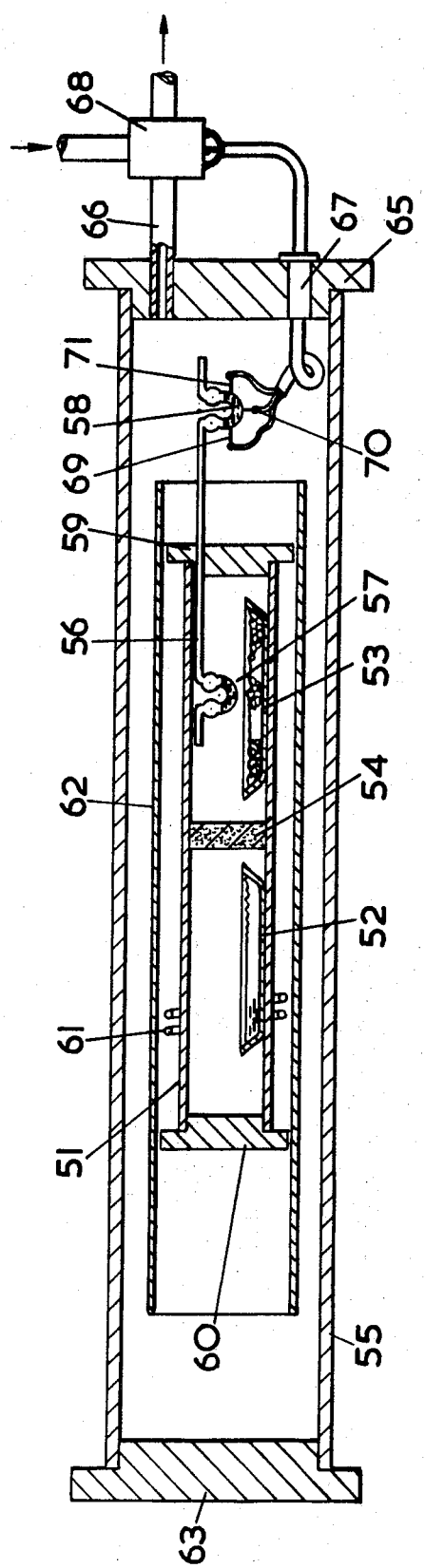
FIG. 5 is a cross-sectional diagram of the growth region of a horizontal apparatus for forming and zone melting compounds.

FIG. 5 is a cross-sectional diagram of the growth region of a horizontal apparatus for forming and zone melting compounds. An inner growth chamber defined by a cylindrical envelope 51 contains a boat 52 and a boat 53 separated by an anti-convection baffle 54. The envelope 51 is placed inside a main pressure chamber defined by an envelope 55. A pressure sensing unit 56 is responsive to the pressure difference between the inner growth chamber and the main pressure chamber and consists of an inner U-tube 57 containing liquid boric oxide, $B_2O_3$, inside the inner growth chamber connected to a U-tube 58 containing a conducting liquid such as mercury or gallium outside the inner growth chamber but inside the main pressure chamber. Four bulbs are formed, one in each arm of each U-tube, in order to allow gas to flow either way in the case of a substantial pressure difference either way.

The connection between the U-tube 57 and the U-tube 58 is made through an end cap 59 fitted to the envelope 51. The other end of the envelope 51 is fitted with an end cap 60. An induction heater 61 is mounted outside the envelope 51 in the region of the boat 52 and an auxiliary resistance heater 62 surrounds the envelope 51.

The envelope 55 is fitted with a first end cap 63 and a second end cap 65 fitted with a gas port 66 and a bush 67. The gas port 66 is connected to a pressure pump (not shown) and an exhaust pump (not shown) via an electrically controlled two-way valve 68.

The U-tube 58 is fitted with electrodes 69, 70 and 71 which are exactly like the electrodes 46, 47 and 48 respectively described above with reference to FIG. 4 and which are connected through the bush 67 to the valve 68.

Provision is made to allow movement of the envelope 51 relative to the induction heater 61 and the heater 62 in order to effect controlled crystallisation.

The action of the apparatus is as follows. A measured quantity of phosphorus is placed in the boat 53 and distilled through the anticonvection baffle 54 into the boat 52 into which is placed a measured quantity of gallium. If all the gallium is to be reacted and the material zone melted the temperature at least in a zone in the boat has to be at the maximum melting point of gallium phosphide which is 1,470°C or thereabouts. At this temperature the equilibrium vapour pressure of phosphorus is about 35 atmospheres. One requires therefore a pressure of about 35 atmospheres in the inner growth chamber. Since the envelope 51 is heated by the heater 62 this can be a hazardous operation and for safety it is desirable to balance this internal pressure with a pressure of 35 atmospheres of inert gas outside the inner growth chamber. To avoid uncertainties in having unknown pressure differentials across the envelope 51 and to have the ability to use readily demountable end caps 59, 60 the pressure sensing unit 56 is incorporated. The function of this unit is to sense pressure differentials and to relay electrical signals which suitably actuate the pressure valve 68 to maintain a pressure balance across the envelope 51.

To avoid the necessity for electrical leads in the hot inner growth chamber the pressure balancing sensor 56 is made in two parts. The inner part 57 functions as a vapour trap. It is sufficiently hot to prevent vapour condensation in it. The outer part 58 allows pressure equilibrium to be established via the pressure valve 68 in the same manner as the sensor described above with reference to FIG. 4.

We claim:

1. Apparatus for the treatment and growth of an at least partly volatile crystallizable material in a sealed two-compartment chamber arrangement comprising:
   an inner growth chamber having the walls thereof remaining fixed relative to each other during treatment and growth of the material;
   a main pressure chamber containing within it the inner growth chambers;
   liquid sealing means positioned and providing fluid communication between the inner chamber and the main pressure chamber including a pull rod capable of both rotational and longitudinal movement, a seal block provided with a screw-threaded bore to receive the pull rod, and a well at one end of the bore to receive material for providing the liquid seal, the screw threaded bore being adapted to cooperate with the pull rod when the rod is rotated to retain the material forming the liquid seal within the seal block and maintain the seal, said liquid sealing means sensitive to a pressure difference between the interior of the inner chamber and the communicating main pressure chamber;
   pressure balancing means responsive to the liquid sealing means for effectively substantially equalizing the pressure inside the inner chamber and the main pressure chamber, whereby the pressure in the inner growth chamber and the main pressure chamber are maintained nearly equal.

2. Apparatus as claimed in claim 1 and wherein the liquid sealing means includes a tube containing liquid, the position of which within the tube is dependent on the pressure difference between the interior of the inner chamber and the pressure chamber.

3. Apparatus as claimed in claim 2 wherein the pressure balancing means includes a sensor responsive to the position of the liquid in the tube, and control valve means responsive to the sensor for adjusting the pressure between the main chamber and the inner chamber.

4. Apparatus as claimed in claim 2 and wherein the tube has a U-shaped first portion of relatively small cross-section for containing the liquid, and a second portion of relatively large cross-section into which the liquid is driven by an appropriate pressure difference between the interior of the inner chamber and the main chamber, so that gas is allowed to flow past the liquid seal and relieve the pressure difference.

5. Apparatus as claimed in claim 1 wherein the pressure balancing means includes an inverted J-shaped tube having one end in communication with the interior of the inner chamber and the other end in a well in the seal block containing material for providing a liquid seal.

6. Apparatus as claimed in claim 1 wherein the pressure balancing means includes a sensor responsive to the position of the liquid in the well and control valve means responsive to the sensor for adjusting the pressure inside the main chamber outside the inner chamber.

7. Apparatus as claimed in claim 1 wherein the means for establishing a liquid seal includes a heating means for melting the material for providing a liquid seal.

8. Apparatus for the treatment and growth of an at least partly volatile crystallizable material in a sealed two-compartment chamber arrangement having an improved sealing relationship comprising:
   an inner growth chamber containing a volatile gas and having the walls thereof remaining fixed relative to each other during treatment and growth of the material;
   a larger main pressure chamber containing within it the inner growth chamber, the main pressure chamber filled with an inert gas;
   liquid sealing means positioned and providing fluid communication between the inner chamber and the main pressure chamber, said liquid sealing means including a pull rod moveable in rotational and longitudinal directions, a seal block provided with a screw-threaded bore to receive the pull rod, and a well at one end of the bore to receive material for providing the liquid seal, the screw-threaded bore cooperating with the pull rod when the rod is rotated to retain the material of the liquid seal within the seal block and thus maintain the seal, thereby separating the volatile and inert gases and sensitive to a pressure difference between the interior of the inner chamber and the surrounding main pressure chamber;
   pressure balancing means responsive to the liquid sealing means for effectively substantially equalizing the pressure of the volatile gas inside the inner chamber and the pressure of the inert gas of the main pressure chamber, whereby the pressure in the inner growth chamber and the main pressure chamber are maintained nearly equal.

* * * * *